US011186382B2

(12) United States Patent
Andrews, Jr. et al.

(10) Patent No.: US 11,186,382 B2
(45) Date of Patent: Nov. 30, 2021

(54) FUEL OXYGEN CONVERSION UNIT

(71) Applicant: General Electric Company, Schenectady, NY (US)

(72) Inventors: Peter Allen Andrews, Jr., Cincinnati, OH (US); Ethan Patrick O'Connor, Hamilton, OH (US); Daniel Alan Niergarth, Norwood, OH (US); Brandon Wayne Miller, Liberty Township, OH (US); Christian Xavier Stevenson, Blanchester, OH (US); David Vickery Parker, Middleton, MA (US)

(73) Assignee: General Electric Company, Schenectady, NY (US)

(*) Notice: Subject to any disclaimer, the term of this patent is extended or adjusted under 35 U.S.C. 154(b) by 161 days.

(21) Appl. No.: 16/179,148

(22) Filed: Nov. 2, 2018

(65) Prior Publication Data

US 2020/0140115 A1    May 7, 2020

(51) Int. Cl.
*B64D 37/34*    (2006.01)
*F02M 37/22*    (2019.01)
(Continued)

(52) U.S. Cl.
CPC .............. *B64D 37/34* (2013.01); *F02C 7/222* (2013.01); *F02C 7/232* (2013.01); *F02M 37/22* (2013.01);
(Continued)

(58) Field of Classification Search
CPC ................ B01D 3/343; B01D 19/0005; B01D 19/0063; B01D 45/14; B01D 2257/104;
(Continued)

(56) References Cited

U.S. PATENT DOCUMENTS 2,582,842 A    1/1952    Messinger
2,720,313 A    10/1955    Pattison
(Continued)

FOREIGN PATENT DOCUMENTS

EP    2003311 A2    12/2008
EP    3018304 A1    5/2016
(Continued)

OTHER PUBLICATIONS

U.S. Appl. No. 15/819,327, filed Nov. 28, 2017.
(Continued)

*Primary Examiner* — Scott J Walthour
(74) *Attorney, Agent, or Firm* — Dority & Manning, P.A.

(57) ABSTRACT

An engine includes a stripping gas source, a combustion section, and a fuel oxygen conversion unit positioned upstream of the combustion section, the fuel oxygen conversion unit defining a stripping gas flowpath in airflow communication with the stripping gas source. The fuel oxygen conversion unit includes a contactor defining a fuel inlet, a gas inlet in airflow communication with the stripping gas flowpath, and a fuel gas mixture outlet; and a fuel gas separator defining a fuel gas mixture inlet for receiving a fuel gas mixture from the contactor, a liquid fuel outlet, and a stripping gas outlet; wherein the stripping gas flowpath receives substantially all of a stripping gas flow therethrough from the stripping gas source and provides the stripping gas flow to the contactor.

19 Claims, 4 Drawing Sheets

(51) Int. Cl.
    *F02C 7/22* (2006.01)
    *B01D 19/00* (2006.01)
    *F02C 7/232* (2006.01)
    *F02C 7/224* (2006.01)

(52) U.S. Cl.
    CPC .... *B01D 19/0063* (2013.01); *B01D 2257/104* (2013.01); *F02C 7/224* (2013.01); *F05D 2210/13* (2013.01); *F05D 2260/213* (2013.01)

(58) Field of Classification Search
    CPC ... B64D 37/34; F01M 2013/0422; F02C 3/22; F02C 6/08; F02C 7/22; F02C 7/222; F02C 7/224; F02C 7/232; F02C 7/236; F02M 37/22; F04D 31/00; F05D 2210/13; F05D 2260/213; F23K 5/04; F23K 5/08; F23K 2900/05082; F23R 2900/00004
    See application file for complete search history.

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2003/0185720 A1* | 10/2003 | Tom .............. B01D 53/9445 422/173 |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2015/0314229 A1* | 11/2015 | Johnson .......... B01D 19/0005 422/187 |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |

(56) References Cited

U.S. PATENT DOCUMENTS

| | | | |
|---|---|---|---|
| 2017/0141419 A1 | 5/2017 | Wu et al. | |
| 2017/0159566 A1 | 6/2017 | Sennoun et al. | |
| 2017/0167382 A1 | 6/2017 | Miller et al. | |
| 2017/0268431 A1* | 9/2017 | Schwarz | F02C 3/04 |
| 2017/0291714 A1 | 10/2017 | Corman | |
| 2018/0016025 A1 | 1/2018 | Rheaume et al. | |
| 2018/0056233 A1 | 3/2018 | Henson et al. | |
| 2018/0056234 A1 | 3/2018 | Weng et al. | |
| 2018/0071659 A1 | 3/2018 | Rhoden | |
| 2018/0118367 A1 | 5/2018 | Rheaume et al. | |
| 2020/0086239 A1 | 3/2020 | Cordatos et al. | |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

* cited by examiner

FUEL OXYGEN CONVERSION UNIT

FIELD

The present subject matter relates generally to a fuel oxygen conversion unit for an engine for reducing an oxygen content of a fuel flow for the engine.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose. Certain of these fuel oxygen conversion systems may utilize a recirculating stripping gas to absorb or otherwise react with the fuel to reduce an oxygen content of the fuel. However, the inventors of the present disclosure have found that providing the appropriate structure for facilitating the recirculation of the stripping gas can add complication and expense to the fuel oxygen conversion system. Accordingly, a fuel oxygen conversion system overcoming these defaults would be useful.

BRIEF DESCRIPTION

Aspects and advantages of the invention will be set forth in part in the following description, or may be obvious from the description, or may be learned through practice of the invention.

In one exemplary embodiment of the present disclosure, an engine is provided. The engine includes a stripping gas source, a combustion section, and a fuel oxygen conversion unit positioned upstream of the combustion section, the fuel oxygen conversion unit defining a stripping gas flowpath in airflow communication with the stripping gas source. The fuel oxygen conversion unit includes a contactor defining a fuel inlet, a gas inlet in airflow communication with the stripping gas flowpath, and a fuel gas mixture outlet; and a fuel gas separator defining a fuel gas mixture inlet for receiving a fuel gas mixture from the contactor, a liquid fuel outlet, and a stripping gas outlet; wherein the stripping gas flowpath receives substantially all of a stripping gas flow therethrough from the stripping gas source and provides the stripping gas flow to the contactor.

In certain exemplary embodiments the stripping gas source is a compressor section of the engine.

In certain exemplary embodiments the stripping gas flow through the stripping gas flowpath is a non-recirculated stripping gas flow.

In certain exemplary embodiments the fuel oxygen conversion unit further includes a gas oxygen reduction unit, wherein the gas oxygen reduction unit is in airflow communication with the stripping gas flowpath at a location upstream of the contactor.

For example, in certain exemplary embodiments the gas oxygen reduction unit includes a catalyst.

For example, in certain exemplary embodiments the gas oxygen reduction unit includes a burner.

For example, in certain exemplary embodiments the gas oxygen reduction unit includes a catalyst, a burner, or both, and wherein the fuel oxygen conversion unit further includes a fuel injector in fluid communication with the stripping gas flowpath at a location within or upstream of the gas oxygen reduction unit.

For example, in certain other exemplary embodiments the fuel injector is configured to provide fuel to the flow of stripping gas through the stripping gas flowpath, such that the flow of stripping gas defines a rich air to fuel ratio.

In certain exemplary embodiments the fuel oxygen conversion unit defines an exhaust gas flowpath in airflow communication with the stripping gas outlet of the fuel gas separator, wherein the exhaust gas flowpath is configured to provide an exhaust airflow through the exhaust gas flowpath to atmosphere.

For example, in certain exemplary embodiments substantially all of a gas from the stripping gas outlet is provided through the exhaust gas flowpath to atmosphere.

In certain exemplary embodiments the fuel oxygen conversion unit further includes a variable throughput valve in airflow communication with the stripping gas flowpath for varying an amount of airflow through the stripping gas flowpath.

For example, in certain exemplary embodiments the fuel oxygen conversion unit further includes a gas oxygen reduction unit, wherein the stripping gas flowpath is in airflow communication with the gas oxygen reduction unit at a location upstream of the contactor, and wherein the variable throughput valve is in airflow communication with the stripping gas flowpath at a location upstream of the gas oxygen reduction unit.

For example, in certain exemplary embodiments the engine further includes a controller configured to receive data indicative of a fuel flow to, or through, the contactor, the fuel gas separator, or a combination of both the contactor and the fuel gas separator, wherein the controller is operably connected to the variable throughput valve and configured to operate the variable throughput valve in response to the received data indicative of the fuel flow.

In certain exemplary embodiments the stripping gas source is an ambient airflow source including a compressor.

In another exemplary embodiment of the present disclosure, a fuel delivery system for an engine including a stripping gas source and a combustion section is provided. The fuel delivery system includes a fuel oxygen conversion unit configured to be positioned upstream of the combustion section of the engine, the fuel oxygen conversion unit defining a stripping gas flowpath configured for airflow communication with the stripping gas source of the engine. The fuel oxygen conversion unit includes a contactor defining a fuel inlet, a gas inlet in airflow communication with the stripping gas flowpath, and a fuel gas mixture outlet; and a fuel gas separator defining a fuel gas mixture inlet for receiving a fuel gas mixture from the contactor, a liquid fuel outlet, and a stripping gas outlet; wherein the stripping gas flowpath receives substantially all of a stripping gas flow therethrough from the stripping gas source and provides the stripping gas flow to the contactor.

In certain exemplary embodiments the stripping gas source is a compressor section of the engine, and wherein the stripping gas flow through the stripping gas flowpath is a non-recirculated stripping gas flow.

In certain exemplary embodiments the fuel oxygen conversion unit further includes a gas oxygen reduction unit, wherein the gas oxygen reduction unit is in airflow communication with the stripping gas flowpath at a location upstream of the contactor.

For example, in certain exemplary embodiments the gas oxygen reduction unit includes a catalyst, a burner, or both.

For example, in certain other exemplary embodiments the fuel oxygen conversion unit further includes a fuel injector in fluid communication with the stripping gas flowpath at a location within or upstream of the gas oxygen reduction unit.

In certain exemplary embodiments the fuel oxygen conversion unit further includes a variable throughput valve in airflow communication with the stripping gas flowpath for varying an amount of airflow through the stripping gas flowpath, and wherein the fuel delivery system further includes a controller configured to receive data indicative of a fuel flow to, or through, the contactor, the fuel gas separator, or a combination of both the contactor and the fuel gas separator, wherein the controller is operably connected to the variable throughput valve and configured to operate the variable throughput valve in response to the receive data indicative of the fuel flow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
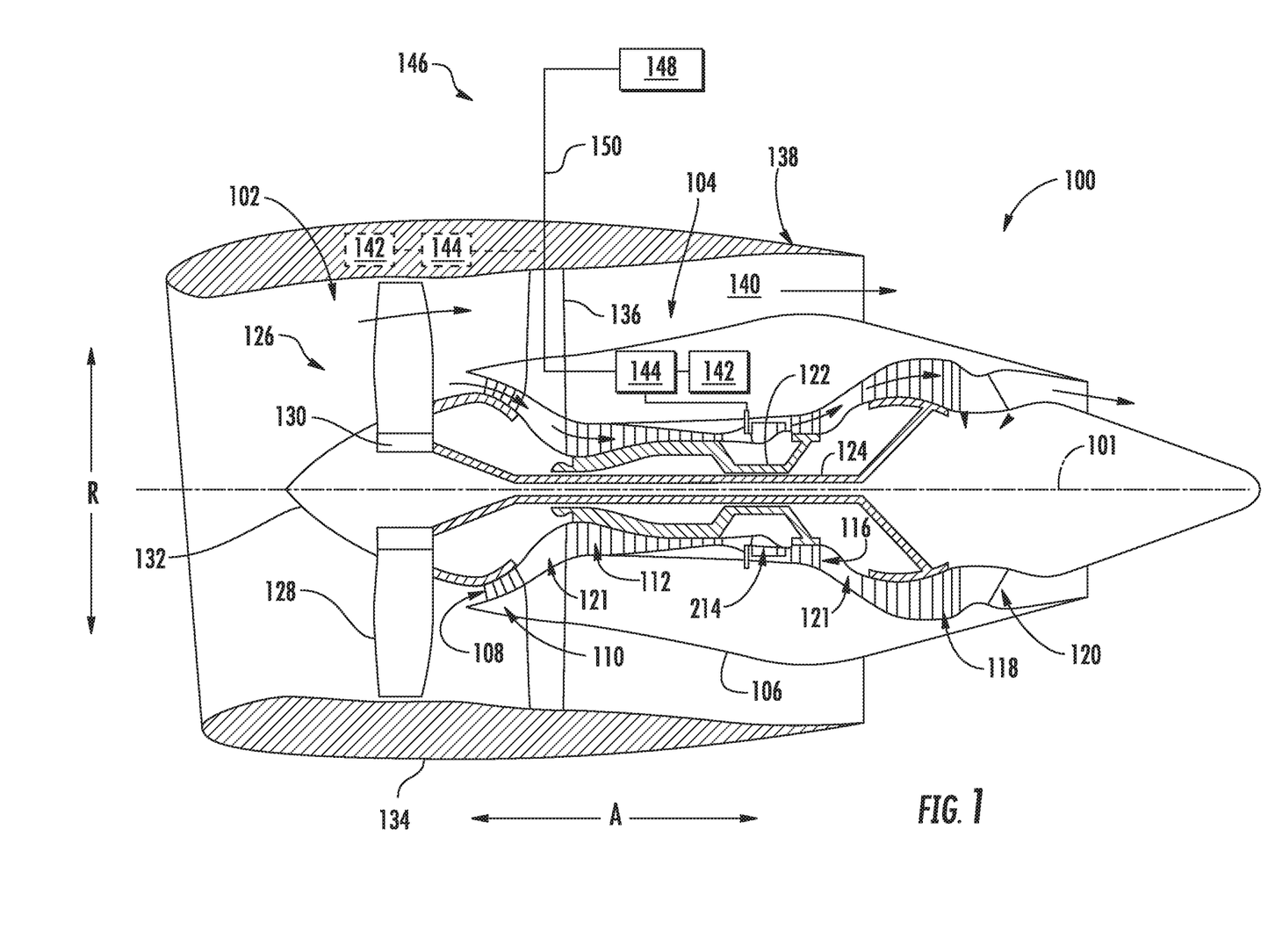
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft or vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion unit" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. A more detailed schematic of a fuel delivery system in accordance with an exemplary embodiment of the present disclosure is provided below with reference to FIG. 2.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted the turbofan engine 100 includes the accessory gearbox 142 and fuel oxygen conversion unit 144 positioned within the turbomachine 104, i.e., within the casing 106 of the turbomachine 104, in other embodiments, the accessory gearbox 142 and fuel oxygen conversion unit 144 may be positioned at any other suitable location. For example, as is depicted in phantom in FIG. 1, in other embodiments, the accessory gearbox 142 and/or the fuel oxygen conversion unit 144 may be positioned within the nacelle 134 of the turbofan engine 100. Alternatively, in still other embodiments, the accessory gearbox 142 may be positioned with the turbofan engine 100 and the fuel oxygen conversion unit 144 may be positioned remote from the turbofan engine 100, such as proximate to, or within, the tank 148 of the fuel delivery system 146. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc. For example, when the accessory gearbox 142 is driven by an electric motor, the electric motor may be configured to receive electrical power from an electric machine/generator being driven by the engine, such as an LP or HP system of the engine.

Figure 2:
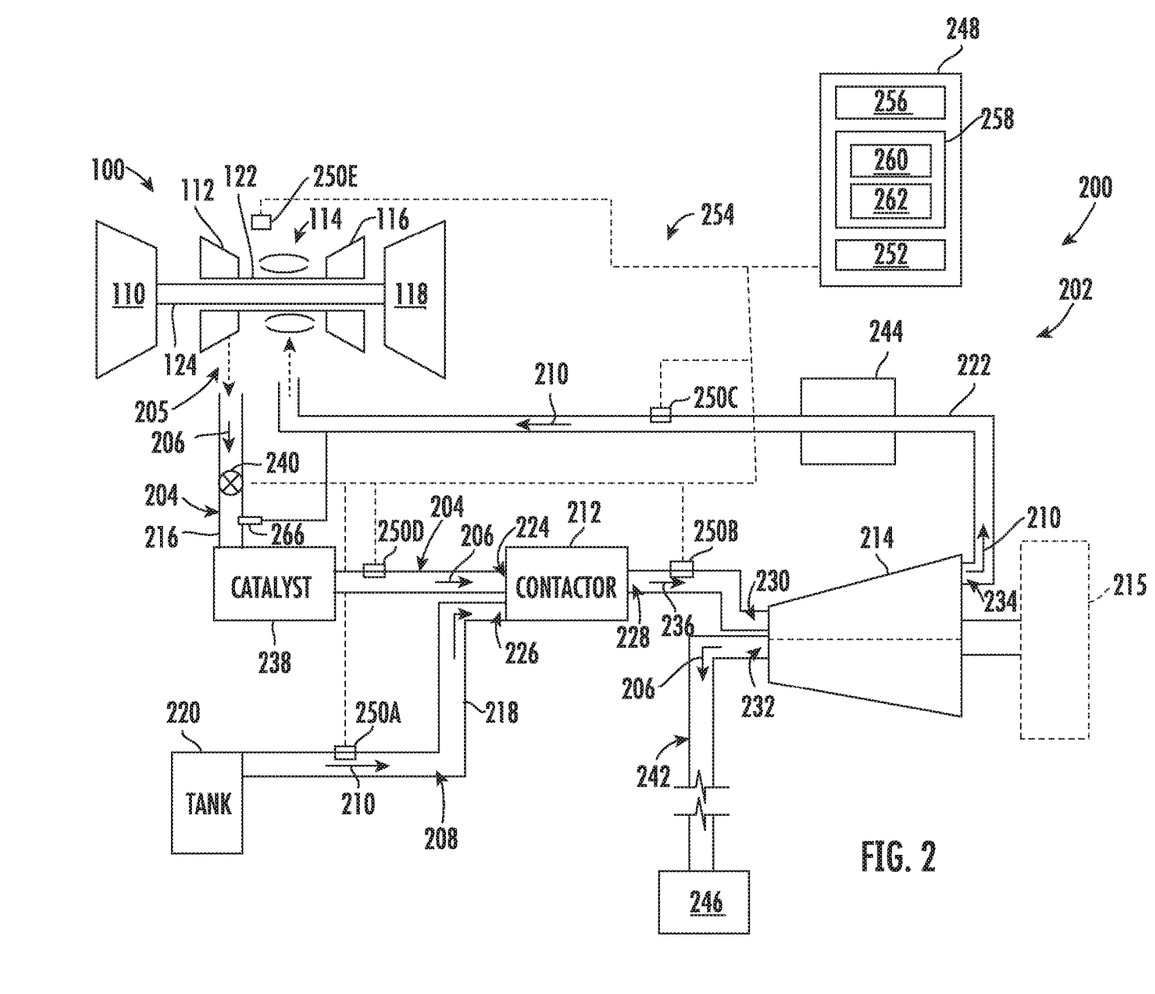
FIG. 2 is a schematic, cross-sectional view of a fuel delivery system in accordance with an exemplary embodiment of the present disclosure.

Referring now to FIG. 2, a schematic drawing of a fuel delivery system 200 including a fuel oxygen conversion unit 202 in accordance with an exemplary aspect of the present disclosure is provided. In at least certain exemplary embodiments, the exemplary fuel delivery system 200 depicted in FIG. 2 may be incorporated into, e.g., the exemplary engine 100 described above with reference to FIG. 1 (e.g., may be the fuel delivery system 146 depicted in FIG. 1 and described above).

More specifically, the exemplary fuel delivery system 200 of FIG. 2 is operable with, e.g., included with, an engine 100. For the embodiment depicted in FIG. 2, the engine 100 is depicted schematically, and is configured as a gas turbine engine 100. The exemplary gas turbine engine 100 may be configured in a similar manner to the exemplary turbofan engine 100 described above with reference to FIG. 1. However, in other embodiments, any other combustion engine, such as any other suitable gas turbine engine, may be utilized with aspects of the present disclosure.

For example, the exemplary engine 100 depicted schematically generally includes a compressor section having a low pressure compressor 110 and a high pressure compressor 112; a combustion section 114; and a turbine section having a high pressure turbine 116 and a low pressure turbine 118. The high pressure compressor 112 and high pressure turbine 116 are coupled through a high pressure spool 122, and similarly, the low pressure compressor 110 and low pressure turbine 118 are coupled through a low pressure spool 124. It will be appreciated, that in other embodiments, the exemplary gas turbine engine 100 may have any other suitable number and/or configuration of compressors and turbines.

As will be appreciated from the discussion herein, the fuel oxygen conversion unit 202 of FIG. 2 is generally positioned upstream of the combustion section 114 of the engine 100. Additionally, for the embodiment shown, the engine 100 includes a stripping gas source 205 and the exemplary fuel oxygen conversion unit 202 defines a stripping gas flowpath 204 for providing a flow of stripping gas 206 to the fuel oxygen conversion unit 202. Further, for the embodiment depicted, the fuel oxygen conversion unit 202 defines a liquid fuel delivery flowpath 208 for providing a flow of liquid fuel 210 to the fuel oxygen conversion unit 202, as is described in greater detail below.

Further, the exemplary fuel oxygen conversion unit 202 depicted in FIG. 2 generally includes a contactor 212 and a fuel gas separator 214. The exemplary contactor 212 depicted may be configured in any suitable manner to substantially mix a received flow of stripping gas 206 and a received flow of liquid fuel 210, as will be described below. For example, the contactor 212 may, in certain embodiments be a mechanically driven contactor (e.g., having paddles for mixing the received flows), or alternatively may be a passive contactor for mixing the received flows using, at least in part, a pressure and/or flowrate of the received flows. Similarly, the fuel gas separator 214 may be configured in any suitable manner for separating a fuel/gas mixture into a flow of gas and a flow of liquid fuel. For example, the fuel gas separator 214 may be a rotary separator driven by a power source 215. However, in other embodiments, the fuel gas separator 214 may be configured in any other suitable manner.

Moreover, the exemplary fuel oxygen conversion unit 202 includes a stripping gas line 216, and more particularly, includes a plurality of stripping gas lines 216, which together at least in part define the stripping gas flowpath 204 extending from the stripping gas source 205 of the engine 100 to the contactor 212. In certain exemplary embodiments, the stripping gas flowpath 204 may be formed of any combination of one or more conduits, tubes, pipes, etc., in addition to the plurality stripping gas lines 216 and structures or components within the stripping gas flowpath 204.

As will be explained in greater detail, below, the fuel oxygen conversion unit 202 generally provides for the flow of stripping gas 206 from the stripping gas source 205, to and through the plurality of stripping gas lines 216 and stripping gas flowpath 204 during operation. It will be appreciated that the term "stripping gas" is used herein as a term of convenience to refer to a gas generally capable of performing the functions described herein. The stripping gas 206 flowing through the stripping gas flowpath 204 may be an actual stripping gas functioning to strip oxygen from the fuel within the contactor 212, or alternatively may be a sparging gas bubbled through a liquid fuel to reduce an oxygen content of such fuel. For example, as will be discussed in greater detail below, the stripping gas 206 may be any suitable gas or gas mixture having a relatively low oxygen content (or capable of achieving a relatively low oxygen content upstream of the contactor 212).

Further, as noted above, the exemplary fuel oxygen conversion unit 202 depicted is operable with the fuel delivery system 200. The exemplary fuel delivery system 200 generally includes a plurality of fuel lines, and in particular, an inlet fuel line 218 (defining in part the inlet fuel flowpath 208) and a fuel source (i.e., a fuel tank 220 for the embodiment shown). The inlet fuel line 218 is fluidly connected to the contactor 212 for providing a flow of liquid fuel 210 to the contactor 212 from the fuel source. The fuel delivery system 200, or rather, the fuel oxygen conversion unit 202 further includes an outlet fuel line 222 that is fluidly connected to the fuel gas separator 214 for receiving a flow of deoxygenated liquid fuel 210 and providing such flow of deoxygenated liquid fuel 210 to the combustion section 114 of the engine 100.

More particularly, for the embodiment of FIG. 2, it will be appreciated that the contactor 212 generally defines a stripping gas inlet 224, a liquid fuel inlet 226, and a fuel/gas mixture outlet 228. Similarly, the exemplary fuel gas separator 214 generally defines a fuel/gas mixture inlet 230, a gas outlet 232, and a liquid fuel outlet 234. During typical operations, a flow of stripping gas 206 and a flow of liquid fuel 210 are received through the stripping gas inlet 224 and liquid fuel inlet 226, respectively, of the contactor 212, and mixed within the contactor 212 to form a fuel/gas mixture 236. The fuel/gas mixture 236 is provided from the fuel/gas mixture outlet 228 of the contactor 212 to the fuel/gas mixture inlet 230 of the fuel gas separator 214. Within the fuel gas separator 214, the fuel/gas mixture 236 is separated back out into a flow of gas 206 and a flow of liquid fuel 210 through the gas outlet 214 and liquid fuel outlet 216, respectively.

As will be explained in greater detail below, when the stripping gas 206 is mixed with the liquid fuel 210, oxygen may be transferred from the liquid fuel 210 to the stripping gas 206 to reduce an effective oxygen content of the liquid fuel 210. In order to ensure the stripping gas 206 has a sufficiently low oxygen content to facilitate such operations, the exemplary fuel oxygen conversion unit 202 further includes a gas oxygen reduction unit. More specifically, for the embodiment shown, the stripping gas flowpath 204 is in airflow communication with the gas oxygen reduction unit at a location upstream of the contactor 212, and further, for the embodiment depicted, the gas oxygen reduction unit comprises, or rather is configured as, a catalyst 238.

Upstream of the catalyst 238, the fuel oxygen conversion unit 202 further includes a fuel injector 266. The fuel injector 266 is in fluid communication with the stripping gas flowpath 204 at a location within or upstream of the gas oxygen reduction unit/catalyst 238. For the embodiment depicted, fuel injector 266 is configured to inject liquid fuel 210 into the flow of stripping gas 206 through the stripping gas flowpath 204 from the outlet fuel line 222 of the fuel oxygen conversion unit 202. However, in other embodiments, the fuel flow may come from any other suitable fuel source, such as the inlet fuel line 218. The fuel injector 266 is generally configured to provide fuel to the non-recirculated flow of stripping gas 206 through the stripping gas flowpath 204, such that the flow stripping gas 206 reaches the stoichiometric limit of the stripping gas 206 or such that the stripping gas 206 defines a rich air to fuel ratio (i.e., a mass ratio of oxygen with the gas 206 to a solid, liquid, or gaseous fuel lower than stoichiometric).

Further, within the catalyst 238, the relatively oxygen-rich stripping gas 206 from the stripping gas source 205, having mixed with the fuel provided through fuel injector 266, is reacted to reduce the oxygen content thereof. It will be appreciated that the catalyst 238 may be configured in any suitable manner to perform such functions. For example, in certain embodiments, the catalyst 238 may include geometries of catalytic components through which the relatively oxygen-rich stripping gas 206 flows to reduce an oxygen content thereof. In one or more of these configurations, a byproduct may be produced, such as water, which may be ducted away from the catalyst 238 (duct not depicted in the embodiment of FIG. 2). In one or more of these embodiments, the gas oxygen reduction unit (i.e., the catalyst 238 for the embodiment depicted) may be configured to reduce an oxygen content of the stripping gas 206 to less than about five percent (5%) oxygen (O2) by mass, such less than about two (2) percent (3%) oxygen (O2) by mass, such less than about one percent (1%) oxygen (O2) by mass.

Accordingly, it will be appreciated that during typical operations, a flow of stripping gas 206 flows from the stripping gas source 205 of the engine 100, through the stripping gas flowpath 204 to the catalyst 238. Briefly, it will be appreciated that for the embodiment shown, the fuel oxygen conversion unit 202 further includes a variable throughput valve 240 in airflow communication with the stripping gas flowpath 204 for varying an amount of airflow through the stripping gas flowpath 204. Specifically, for the embodiment shown, the variable throughput valve 240 is in airflow communication with the stripping gas flowpath 204 at a location upstream of the gas oxygen reduction unit, or rather, upstream of the catalyst 238 for the embodiment depicted. In such a manner, the variable throughput valve 240 may generally control certain operations of the fuel oxygen conversion unit 202, as will be described in greater detail below.

Further, as briefly touched on above, it will be appreciated that the stripping gas flowpath 204 receives substantially all of the flow of stripping gas 206 therethrough from the stripping gas source 205 and provides the flow of stripping gas 206 to the gas inlet 224 of the contactor 212. More specifically, for the embodiment shown, the stripping gas source 205 is the compressor section of the engine 100, such that stripping gas flowpath 204 receives substantially all of the flow of stripping gas 206 therethrough from the compressor section of the engine 100. More specifically, for the embodiment shown, the stripping gas source 205 is the high pressure compressor 112 of the compressor section of the engine 100, such that the stripping gas flowpath 204 receives substantially all of the flow of stripping gas 206 therethrough from the high pressure compressor 112 of the compressor section of the engine 100. Further, in such a manner, it will be appreciated that the flow of stripping gas 206 through the stripping gas flowpath 204 is a flow of non-recirculated stripping gas 206.

Referring still to typical operations of the exemplary fuel oxygen conversion unit 202 depicted, the oxygen content of the stripping gas 206 is reduced as it flows through the gas oxygen reduction unit/catalyst 238 for the embodiment shown, and is subsequent provided to the stripping gas inlet 224 of the contactor 212. Simultaneously, a flow of liquid fuel 210 is provided from the fuel source, or rather, the fuel tank 220, through the inlet fuel line 218 to the liquid fuel inlet 226 of the contactor 212. Within the contactor 212, the stripping gas 206 and liquid fuel 210 are mixed to generate the fuel gas mixture 236.

Generally, it will be appreciated that during operation of the fuel oxygen conversion unit 202, the liquid fuel 210 provided through the inlet fuel line 218 to the contactor 212 may have a relatively high oxygen content. By contrast, as noted above, the stripping gas 206 provided to the contactor 212 may have a relatively low oxygen content or other specific chemical structure. As a result of mixing the stripping gas 206 with the liquid fuel 210, a physical exchange may occur whereby at least a portion of the oxygen within the fuel 210 is transferred to the stripping gas 206, such that the fuel component of the mixture 236 has a relatively low oxygen content (as compared to the fuel 210 provided through inlet fuel line 218) and the stripping gas component of the mixture 236 has a relatively high oxygen content (as compared to the stripping gas 206 provided through the stripping gas flowpath 204 to the contactor 212).

The fuel gas mixture 236 generated within the contactor 212 is provided from the fuel/gas outlet of the contactor 212 to the fuel/gas inlet 218 of the fuel gas separator 214. Within the fuel gas separator 214 the fuel gas mixture 236 may be separated back into the flow of liquid fuel 210 and the flow of stripping gas 206. The liquid fuel 210 may be provided through the liquid fuel outlet 234 of the fuel gas separator 214 to the outlet fuel line 222, and the stripping gas 206 may be provided to the gas outlet 232 of the fuel gas separator 214 to an exhaust gas flowpath 242 (the exhaust gas flowpath 242 being in airflow communication with the stripping gas outlet 232 of the fuel gas separator 214).

Notably, the liquid fuel 210 provided to the liquid fuel outlet 216, having interacted with the stripping gas 206, may accordingly have a relatively low oxygen content, such that a relatively high amount of heat may be added thereto with a reduced risk of the fuel coking (i.e., chemically reacting to form solid particles which may clog up or otherwise damage components within the fuel flow path). In at least certain exemplary aspects, for example, the fuel 210 provided to the liquid fuel outlet 216 may have an oxygen content of less than about five (5) parts per million ("ppm"), such as less than about three (3) ppm, such as less than about two (2) ppm, such as less than about one (1) ppm, such as less than about 0.5 ppm. In such a manner, for example, as is depicted schematically, the outlet fuel line 222 may be in thermal communication with a heat exchanger 244 configured to add heat to the flow of liquid fuel 210, at a location downstream of the fuel gas separator 214 and upstream of the combustion section 114 of the engine 100. The heat exchanger 244 may be configured to transfer heat from an engine system, an aircraft system, or any other heat source, to the flow of fuel 210.

By contrast, the exhaust gas flowpath 242 defined by the fuel oxygen conversion unit 202 may provide an exhaust airflow (i.e., an airflow of stripping gas 206 having received oxygen from the flow of liquid fuel 210) to an exhaust airflow sink 246. More specifically, for the embodiment shown, the exhaust gas flowpath 242 is configured to provide the exhaust airflow through the exhaust gas flowpath 242 to atmosphere. For example, the exhaust gas flowpath 242 may be configured to provide the exhaust airflow through the exhaust gas flowpath 242 to a bypass passage of the engine 100 (e.g., when the engine 100 is configured as a ducted gas turbine engine 100; see bypass passage 140 of FIG. 1), or alternatively, may be configured to provide the exhaust airflow directly to atmosphere.

In such a manner, it will be appreciated that the exemplary fuel oxygen conversion unit 202 of the embodiment depicted utilizes a nonrecirculating stripping gas. Specifically, substantially all of the stripping gas flow through the fuel oxygen conversion unit 202 is provided from the stripping gas source 205, through the stripping gas flowpath 204, and is subsequently exhausted and not reused. Such may allow for a less complicated fuel oxygen conversion unit 202, as there is no, or lesser, need for a separate gas booster pump, additional recirculating structure, etc.

Further, it will be appreciated that a fuel oxygen conversion unit 202 in accordance with such an exemplary embodiment may allow for more desirable control over the amount of oxygen reduction of the liquid fuel 210 through the fuel delivery system 200. Specifically, as is also depicted in FIG. 2, the fuel delivery system 200/fuel oxygen conversion unit 202 further includes a controller 248 and a plurality of sensors 250. For example, the plurality of sensors 250 include one or more sensors 250 configured to sense data indicative of a fuel flow to, or through, the contactor 212, the fuel gas separator 214, or combination of both the contactor 212 and the fuel gas separator 214. Specifically, for the embodiment shown, the one or more sensors 250 include a flow sensor 250A in the liquid fuel inlet line 218 for sensing data indicative of a fuel flow to the contactor 212, a flow sensor 250B downstream of the contactor 212 and upstream of the fuel gas separator 214 for sensing data indicative of a flow of a fuel/gas mixture 236 between the two components, and a flow sensor 250C in the liquid fuel outlet line 222 for sensing data indicative of a fuel flow from the fuel gas separator 214. Moreover, the one or more sensors 250 includes a flow sensor 250D in the stripping gas flowpath 204 for sensing data indicative of a flow of stripping gas to the stripping gas flowpath 204. Further, the one or more sensors 250 includes an engine sensor 250E configured to sense data indicative of one or more operability parameters of the engine 100 (e.g., compressor pressure, compressor inlet/outlet temperature, turbine inlet/outlet temperature, rotational speeds, etc.), which may indicate a fuel flow to the engine 100.

Moreover, for the exemplary embodiment of FIG. 2, the exemplary controller 248 is operably connected to each of the one or more sensors 250, as well as the variable throughput valve 240. Specifically, the controller 248 generally includes a network interface 252. The network interface 252 may be operable with any suitable wired or wireless communications network for communicating data with other components of, e.g., the fuel delivery system 200/fuel oxygen conversion unit 202, the engine 100, and/or other components or systems not depicted. As is depicted using phantom lines in FIG. 2, for the embodiment depicted, the network interface 252 utilizes a wireless communication network 254 to communicate data with other components. Specifically, for the embodiment shown, through the network interface 252 of the controller 248 and the wireless communication network 254, the controller 248 is operably coupled to the one or more sensors 250 and the variable throughput valve 240. It will be appreciated, of course, that although the network interface 252 utilizes the wireless communication network 254 for the embodiment of FIG. 2, in other embodiments, the network interface 252 may instead utilize a wired communication network, or a combination of wired and wireless communication networks.

Referring still to FIG. 2, the controller 248 further includes one or more processors 256 and memory 258. The memory 258 stores data 260 accessible by the one or more processors 256. The one or more processor(s) 252 can include any suitable processing device, such as a microprocessor, microcontroller 248, integrated circuit, logic device, and/or other suitable processing device. The one or more memory device(s) 258 can include one or more computer-readable media, including, but not limited to, non-transitory computer-readable media, RAM, ROM, hard drives, flash drives, and/or other memory devices. The data 260 may include instructions 262 that when executed by the one or more processors 256 cause the system to perform functions. The instructions 262 within the memory 258 can be any set of instructions that when executed by the one or more processor(s) 252, cause the one or more processor(s) 252 to perform operations, such as one or more of the operations described herein. In certain exemplary embodiments, the instructions 262 within the memory 258 can be software written in any suitable programming language or can be implemented in hardware. Additionally, and/or alternatively, the instructions can be executed in logically and/or virtually separate threads on processor(s) 252. The memory device(s) 254 can further store other data 260 that can be accessed by the processor(s) 252.

In such a manner, it will be appreciated that in at least certain exemplary embodiments, the controller 248 may be configured to receive data from the one or more sensors 250, and may control operations of the fuel oxygen conversion unit 202 in response to the data received from the one or more sensors 250. For example, the exemplary controller 248 may be configured to operate the variable throughput valve 240 in response to the receive data from the one or more sensors 250 indicative of a fuel flow to, or through, the contactor 212, the fuel gas separator 214, or combination of both the contactor 212 and the fuel gas separator 214. For example, in response to receiving data indicative of an increase in a fuel flow to/through the contactor 214/fuel gas separator 214, the controller 248 may actuate the variable throughput valve 240 to increase an amount of stripping gas allowable through the stripping gas flowpath 204 from the stripping gas source 205. By contrast, in response to receiving data indicative of a decrease in a fuel flow to/through the contactor 214/fuel gas separator 214, the controller 248 may actuate the variable throughput valve 240 to reduce an amount of stripping gas allowable through the stripping gas flowpath 204 from the stripping gas source 205.

It will be appreciated, however, that the exemplary fuel oxygen conversion unit 202 described above is provided by way of example only. In other embodiments, the fuel oxygen conversion unit 202 may be configured in any other suitable manner. For example, referring now to FIG. 3, a fuel delivery system 200 in accordance with another exemplary embodiment of the present disclosure is provided. The exemplary fuel delivery system 200 of FIG. 3 may be configured in substantially the same manner as the exemplary fuel delivery system 200 described above with reference to FIG. 2. For example, the exemplary fuel delivery system 200 generally includes a fuel oxygen conversion unit 202 positioned upstream of a combustion section 114 of an engine 100, with the fuel oxygen conversion unit 202 defining a stripping gas flowpath 204 in airflow communication with a stripping gas source 205 of the engine 100. Further, the fuel oxygen conversion unit 202 generally includes a contactor 212 in airflow communication with the stripping gas flowpath 204 and a liquid fuel inlet line 218, as well as a fuel gas separator 214 positioned downstream of the contactor 212 for receiving a fuel/gas mixture 236 from the contactor 212 and separating such fuel/gas mixture 236 back into a flow of stripping gas 206 (provided through the exhaust flowpath 242) and a flow of liquid fuel 210 provided to the combustion section of the engine 100 through an outlet line 222.

Figure 3:
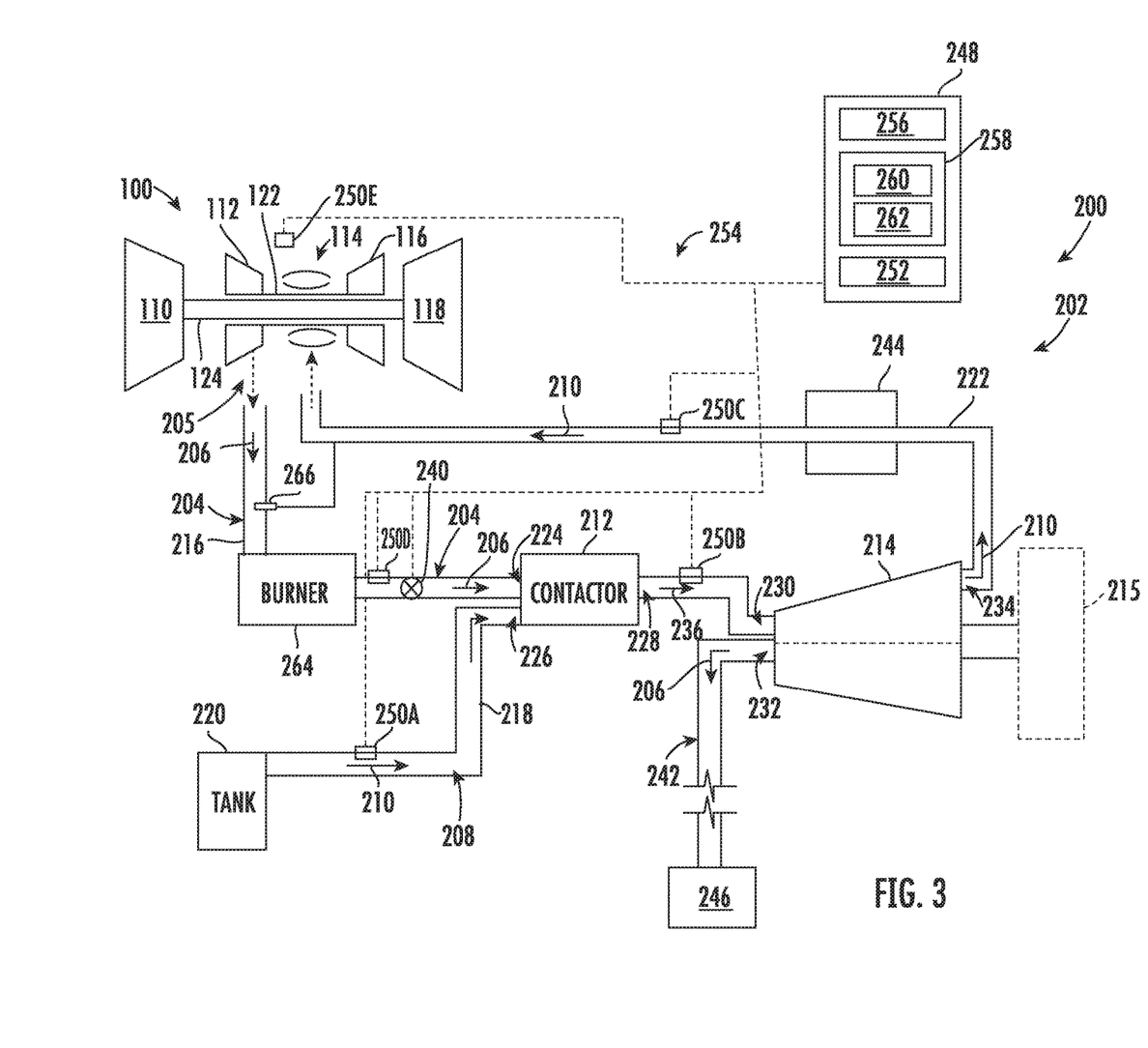
FIG. 3 is a schematic, cross-sectional view of a fuel delivery system in accordance with another exemplary embodiment of the present disclosure.

Moreover, the exemplary fuel oxygen conversion unit 202 further includes a gas oxygen reduction unit in airflow communication with the stripping gas flowpath 204 at a location upstream of the contactor 212. However, for the embodiment depicted, the gas oxygen reduction unit is not configured as a catalyst (e.g., catalyst 238 of FIG. 2), and instead is configured as a burner 264 configured to combust the flow of stripping gas 206 provided thereto from the striping gas source 205 through the stripping gas flowpath 204. Notably, in order to facilitate such combustion, the fuel oxygen conversion unit 202 further includes a fuel injector 266 in fluid communication with the stripping gas flowpath 204 at a location within or upstream of the gas oxygen reduction unit/burner 264. For the embodiment depicted, fuel injector 266 is configured to inject liquid fuel 210 into the flow of stripping gas 206 through the stripping gas flowpath 204 from the outlet fuel line 222 of the fuel oxygen conversion unit 202. However, in other embodiments, the fuel flow may come from any other suitable fuel source, such as the inlet fuel line 218. The fuel injector 266 is generally configured to provide fuel to a non-recirculated flow of stripping gas 206 through the stripping gas flowpath 204, such that the flow stripping gas 206 defines a rich air to fuel ratio (i.e., a mass ratio of oxygen with the gas 206 to a solid, liquid, or gaseous fuel lower than stoichiometric). Notably, however, it should be appreciated that in other exemplary embodiments, any other suitable gas oxygen reduction unit may be provided.

Further for the embodiment depicted, the fuel oxygen conversion unit 202 includes a variable throughput valve 240 in airflow communication with the stripping gas flowpath 204 for varying an amount of airflow through the stripping gas flowpath 204. However, by contrast to the embodiment of FIG. 2, the exemplary variable throughput valve 240 is in airflow communication with the stripping gas flowpath 204 at a location downstream of the gas oxygen reduction unit (i.e., the burner 264 for the embodiment of FIG. 3). As with the embodiment of FIG. 2, the variable throughput valve 240 is operably coupled to a controller 248 for controlling operation of the fuel oxygen conversion unit 202.

Figure 4:
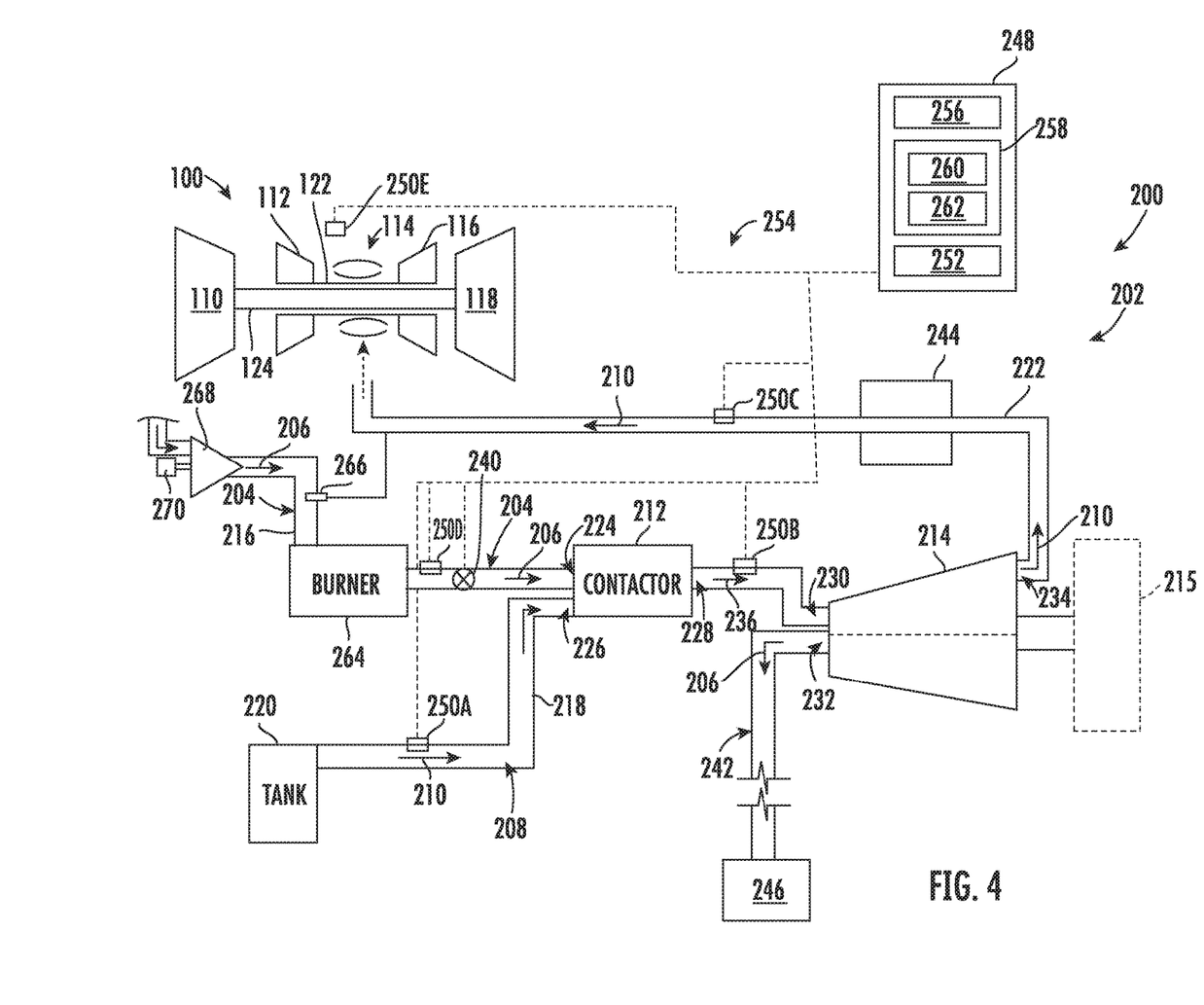
FIG. 4 is a schematic, cross-sectional view of a fuel delivery system in accordance with yet another exemplary embodiment of the present disclosure.

It will be appreciated, however, that in still other exemplary embodiments, other configurations may be provided. For example, referring now briefly to FIG. 4, a fuel delivery system 200 in accordance with yet another exemplary embodiment of the present disclosure is provided. The exemplary fuel delivery system 200 of FIG. 4 may be configured in substantially the same manner as the exemplary fuel delivery system 200 described above with reference to FIG. 2. For example, the exemplary fuel delivery system 200 generally includes a fuel oxygen conversion unit 202 positioned upstream of a combustion section 114 of an engine 100, with the fuel oxygen conversion unit 202 defining a stripping gas flowpath 204 in airflow communication with a stripping gas source 205 of the engine 100. However, for the embodiment shown, the stripping gas source 205 is not a compressor section of the engine 100. Instead, the stripping gas source 205 is a low pressure airflow source, such as an ambient airflow source, and includes a dedicated compressor 268 being driven by a power source. More specifically, for the embodiment shown, the compressor 268 is driven by an electric motor 270, which may receive electrical power from one or more of the engine systems, aircraft systems, a battery pack, etc. However, in other embodiments, the compressor 268 may be driven by any other suitable motor (e.g., hydraulic, pneumatic, etc.). The low pressure airflow source may be a bypass passage of the engine 100 (see, e.g., passage 140 of FIG. 1), or any suitable ambient airflow location (e.g., outside a nacelle of the engine 100 if provided).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine comprising:
   a stripping gas source;
   a combustion section; and
   a fuel oxygen conversion unit positioned upstream of the combustion section, the fuel oxygen conversion unit defining a stripping gas flowpath in airflow communication with the stripping gas source and comprising
      a contactor defining a fuel inlet, a gas inlet in airflow communication with the stripping gas flowpath, and a fuel gas mixture outlet; and
      a fuel gas separator defining a fuel gas mixture inlet for receiving a fuel gas mixture from the contactor, a liquid fuel outlet, and a stripping gas outlet;
   wherein substantially all of the stripping gas flow flowing through the stripping gas outlet of the fuel gas separator is exhausted from the fuel oxygen conversion unit;
   wherein the stripping gas flow through the stripping gas flowpath is a non-recirculated stripping gas flow such that the stripping gas flow passes through the fuel gas separator only once.

2. The engine of claim 1, wherein the stripping gas source is a compressor section of the engine.

3. The engine of claim 1, wherein the fuel oxygen conversion unit further comprises a gas oxygen reduction unit, wherein the gas oxygen reduction unit is in airflow communication with the stripping gas flowpath at a location upstream of the contactor.

4. The engine of claim 3, wherein the gas oxygen reduction unit comprises a catalyst.

5. The engine of claim 3, wherein the gas oxygen reduction unit comprises a burner.

6. The engine of claim 3, wherein the gas oxygen reduction unit comprises a catalyst, a burner, or both, and wherein the fuel oxygen conversion unit further comprises a fuel injector in fluid communication with the stripping gas flowpath at a location within or upstream of the gas oxygen reduction unit.

7. The engine of claim 6, wherein the fuel injector is configured to provide fuel to the flow of stripping gas through the stripping gas flowpath, such that the flow of stripping gas defines a rich air to fuel ratio.

8. The engine of claim 1, wherein the fuel oxygen conversion unit defines an exhaust gas flowpath in airflow communication with the stripping gas outlet of the fuel gas separator, wherein the exhaust gas flowpath is configured to provide an exhaust airflow through the exhaust gas flowpath to atmosphere.

9. The engine of claim 8, wherein substantially all of a gas from the stripping gas outlet is provided through the exhaust gas flowpath to atmosphere.

10. The engine of claim 1, wherein the fuel oxygen conversion unit further comprises a variable throughput valve in airflow communication with the stripping gas flowpath for varying an amount of airflow through the stripping gas flowpath.

11. The engine of claim 10, wherein the fuel oxygen conversion unit further comprises a gas oxygen reduction unit, wherein the stripping gas flowpath is in airflow communication with the gas oxygen reduction unit at a location upstream of the contactor, and wherein the variable throughput valve is in airflow communication with the stripping gas flowpath at a location upstream of the gas oxygen reduction unit.

12. The engine of claim 10, further comprising:

a controller configured to receive data indicative of a fuel flow to, or through, the contactor, the fuel gas separator, or a combination of both the contactor and the fuel gas separator, wherein the controller is operably connected to the variable throughput valve and configured to operate the variable throughput valve in response to the received data indicative of the fuel flow.

13. The engine of claim 1, wherein the stripping gas source is an ambient airflow source including a compressor.

14. A fuel delivery system for an engine, the engine comprising a stripping gas source and a combustion section, the fuel delivery system comprising:

a fuel oxygen conversion unit configured to be positioned upstream of the combustion section of the engine, the fuel oxygen conversion unit defining a stripping gas flowpath configured for airflow communication with the stripping gas source of the engine, the fuel oxygen conversion unit comprising a contactor defining a fuel inlet, a gas inlet in airflow communication with the stripping gas flowpath, and a fuel gas mixture outlet; and a fuel gas separator defining a fuel gas mixture inlet for receiving a fuel gas mixture from the contactor, a liquid fuel outlet, and a stripping gas outlet;

wherein substantially all of the stripping gas flow flowing through the stripping gas outlet of the fuel gas separator is exhausted from the fuel oxygen conversion unit;

wherein the stripping gas flow through the stripping gas flowpath is a non-recirculated stripping gas flow such that the stripping gas flow passes through the fuel gas separator only once.

15. The fuel delivery system of claim 14, wherein the stripping gas source is a compressor section of the engine.

16. The fuel delivery system of claim 14, wherein the fuel oxygen conversion unit further comprises a gas oxygen reduction unit, wherein the gas oxygen reduction unit is in airflow communication with the stripping gas flowpath at a location upstream of the contactor.

17. The fuel delivery system of claim 16, wherein the gas oxygen reduction unit comprises a catalyst, a burner, or both.

18. The fuel delivery system of claim 17, wherein the fuel oxygen conversion unit further comprises a fuel injector in fluid communication with the stripping gas flowpath at a location within or upstream of the gas oxygen reduction unit.

19. The fuel delivery system of claim 14, wherein the fuel oxygen conversion unit further comprises a variable throughput valve in airflow communication with the stripping gas flowpath for varying an amount of airflow through the stripping gas flowpath, and wherein the fuel delivery system further comprises:

a controller configured to receive data indicative of a fuel flow to, or through, the contactor, the fuel gas separator, or a combination of both the contactor and the fuel gas separator, wherein the controller is operably connected to the variable throughput valve and configured to operate the variable throughput valve in response to the receive data indicative of the fuel flow.

* * * * *